(12) United States Patent
Warbey

(10) Patent No.: US 11,105,428 B2
(45) Date of Patent: *Aug. 31, 2021

(54) VALVE SEATS, VALVE ASSEMBLIES, AND RELATED METHODS

(71) Applicant: Flowserve Management Company, Irving, TX (US)

(72) Inventor: Paul Simon Warbey, Horsham (GB)

(73) Assignee: Flowserve Management Company, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,750

(22) Filed: May 26, 2020

(65) Prior Publication Data
US 2020/0284358 A1 Sep. 10, 2020

Related U.S. Application Data

(63) Continuation of application No. 16/213,638, filed on Dec. 7, 2018, now Pat. No. 10,801,627.

(51) Int. Cl.
*F16K 5/06* (2006.01)
*F16K 5/20* (2006.01)

(52) U.S. Cl.
CPC .......... *F16K 5/0673* (2013.01); *F16K 5/0689* (2013.01); *F16K 5/201* (2013.01)

(58) Field of Classification Search
CPC .... F16K 5/0673; F16K 5/0678; F16K 5/0689; F16K 5/201; F16K 5/204; F16K 5/205
See application file for complete search history.

(56) References Cited

U.S. PATENT DOCUMENTS

| | | | | | |
|---|---|---|---|---|---|
| 2,529,412 | A | * | 11/1950 | Parker | F16K 5/0464 251/174 |
| 2,868,498 | A | ‡ | 1/1959 | Kaiser | F16K 5/0673 251/172 |
| 3,211,420 | A | ‡ | 10/1965 | Hartmann | F16K 5/0673 251/309 |
| 3,301,523 | A | ‡ | 1/1967 | Lowrey | F16K 5/0673 251/172 |
| 3,346,234 | A | ‡ | 10/1967 | Allen | F16K 5/0673 251/17 |

(Continued)

FOREIGN PATENT DOCUMENTS

CN 104565421 4/2015
CN 104565421 A ‡ 4/2015

(Continued)

OTHER PUBLICATIONS

PCT International Patent Application No. PCT/US2019/064145, International Search Report dated Mar. 5, 2020, 2 pp.‡

(Continued)

*Primary Examiner* — David Colon-Morales
(74) *Attorney, Agent, or Firm* — Phillips Winchester

(57) ABSTRACT

Valve seats may include an insert and a housing. The insert may comprise a first material and the housing may comprise a second material. The second material of the housing may exhibit a hardness that is greater than a hardness of the first material of the insert. Valve assemblies and related method may include valve seats.

20 Claims, 6 Drawing Sheets

(56) References Cited

U.S. PATENT DOCUMENTS

| | | | | |
|---|---|---|---|---|
| 3,357,679 A ‡ | 12/1967 | Gulick | F16K 5/0673 | 251/172 |
| 3,380,708 A ‡ | 4/1968 | Scaramucci | F16K 5/0673 | 251/172 |
| 3,408,038 A ‡ | 10/1968 | Scaramucci | F16K 5/0673 | 251/175 |
| 3,462,120 A | 8/1969 | Priese | | |
| 3,497,177 A ‡ | 2/1970 | Hulsey | F16K 3/0227 | 251/17 |
| 3,504,885 A ‡ | 4/1970 | Hulsey | F16K 5/0673 | 251/17 |
| 3,508,736 A ‡ | 4/1970 | Pool | F16K 5/0673 | 251/172 |
| 3,508,738 A ‡ | 4/1970 | Stewart, Jr. | F16K 5/0673 | 251/315.01 |
| 3,521,855 A ‡ | 7/1970 | Jensen | F16K 5/0673 | 251/172 |
| 3,533,597 A ‡ | 10/1970 | Bolling | F16K 5/201 | 251/174 |
| 3,542,335 A ‡ | 11/1970 | Scaramucci | F16K 5/0673 | 251/172 |
| 3,556,474 A ‡ | 1/1971 | Scaramucci et al. | F16K 5/0673 | 251/172 |
| 3,584,641 A ‡ | 6/1971 | Milleville | F16K 5/0673 | 137/246.15 |
| 3,610,569 A ‡ | 10/1971 | Reaves | F16K 3/207 | 251/52 |
| 3,617,025 A ‡ | 11/1971 | Gerbic | F16K 5/205 | 251/17 |
| 3,667,727 A | 6/1972 | Bowden | | |
| 3,776,506 A ‡ | 12/1973 | Fowler | F16K 5/205 | 251/17 |
| 3,778,029 A ‡ | 12/1973 | Baker | F16K 5/0673 | 251/315.1 |
| 4,083,376 A ‡ | 4/1978 | Alaniz | F16K 5/0673 | 137/24 |
| 4,111,393 A ‡ | 9/1978 | McClurg | F16K 5/0673 | 251/174 |
| 4,163,544 A | 8/1979 | Fowler | | |
| 4,177,833 A ‡ | 12/1979 | Morrison | F16K 3/0227 | 137/625.12 |
| 4,254,793 A | 3/1981 | Scaramucci | | |
| 4,280,522 A ‡ | 7/1981 | Pechnyo | F16K 5/0673 | 137/72 |
| 4,290,581 A * | 9/1981 | Moran | F16K 5/207 | 251/172 |
| 4,483,511 A ‡ | 11/1984 | Kushida | F16K 5/201 | 251/172 |
| 4,673,164 A ‡ | 6/1987 | Nakanishi | F16K 5/0673 | 251/174 |
| 4,684,105 A ‡ | 8/1987 | Haas, II | F16K 5/0626 | 251/150 |
| 5,163,655 A ‡ | 11/1992 | Chickering, III | F16K 3/20 | 251/174 |
| 5,267,722 A ‡ | 12/1993 | Coulter | F16K 5/0673 | 251/315.01 |
| 5,338,003 A ‡ | 8/1994 | Beson | F16K 3/205 | 251/17 |
| 5,419,532 A ‡ | 5/1995 | Fan | F16K 5/0673 | 251/315.08 |
| 5,494,256 A ‡ | 2/1996 | Beson | F16K 3/205 | 251/17 |
| 5,533,738 A ‡ | 7/1996 | Hoffmann | F16K 5/201 | 277/38 |
| 6,029,948 A ‡ | 2/2000 | Shafer | F16K 5/0673 | 251/171 |
| 6,047,952 A ‡ | 4/2000 | Laskaris | F16K 5/0663 | 251/31 |
| 6,669,171 B1‡ | 12/2003 | Stunkard | F16K 5/0642 | 251/315.08 |
| 7,690,626 B2 * | 4/2010 | Stunkard | F16K 5/0668 | 251/174 |
| 7,758,016 B2 ‡ | 7/2010 | Scott | F16K 5/205 | 251/19 |
| 7,988,127 B2 ‡ | 8/2011 | Parra | F16K 5/0673 | 251/17 |
| 8,490,949 B2 ‡ | 7/2013 | Lanning | F16K 99/00 | 251/31 |
| 9,140,410 B2 ‡ | 9/2015 | Malnou | F16K 5/0673 | |
| 10,030,784 B2 ‡ | 7/2018 | Lanning | F16K 5/205 | |
| 10,801,627 B2 * | 10/2020 | Warbey | F16K 5/0689 | |
| 2003/0111631 A1* | 6/2003 | Gosling | F16K 5/201 | 251/315.01 |
| 2007/0278438 A1‡ | 12/2007 | Scott | F16K 5/0673 | 251/17 |
| 2008/0157016 A1‡ | 7/2008 | Parra | F16K 5/0673 | 251/21 |
| 2008/0179558 A1‡ | 7/2008 | Lloyd | F16K 5/0673 | 251/180 |
| 2010/0200791 A1‡ | 8/2010 | Yung | F16K 5/0673 | 251/172 |
| 2011/0260088 A1‡ | 10/2011 | Cunningham | F16K 5/0642 | 251/315.01 |
| 2014/0203203 A1‡ | 7/2014 | Scattini | F16K 5/0663 | 251/317 |
| 2014/0319395 A1‡ | 10/2014 | Warbey | F16K 5/0678 | 251/18 |
| 2015/0300509 A1* | 10/2015 | He | F16K 5/201 | 251/174 |
| 2016/0102768 A1‡ | 4/2016 | Lo Cicero | F16K 5/0668 | 277/500 |
| 2016/0369901 A1‡ | 12/2016 | Lanning | F16K 27/067 | |
| 2019/0107211 A1‡ | 4/2019 | Lo Cicero | F16K 25/005 | |

FOREIGN PATENT DOCUMENTS

| | | |
|---|---|---|
| DE | 102007024625 | 11/2008 |
| EP | 0018880 | 11/1980 |
| JP | 2002005314 | 1/2002 |
| KR | 20180032265 | 3/2018 |
| RU | 2115050 | 7/1998 |
| RU | 2115050 C1 ‡ | 7/1998 |
| RU | 2255259 | 6/2005 |
| RU | 2255259 C1 ‡ | 6/2005 |
| WO | WO-2016/007127 A1 ‡ | 1/2016 ........... F16K 5/0668 |
| WO | WO2016007127 | 1/2016 |

OTHER PUBLICATIONS

PCT International Patent Application No. PCT/US2019/064145, Written Opinion dated Mar. 5, 2020, 6 pp.‡
"Teflon PTFE" by Dupont (publicly available since Nov. 16, 2012, referred as "Dupont") (Year: 2012).‡
"Nylon 6/6 (Polyamide)" by Poly-tech (publicly available since 2011, referred as "Polytech") (Year: 2011).‡
"Hardness Comparison Chart" by Redwood Plastics (publicly available since Oct. 13, 2011, referred as "Redwood") (Year: 2011).‡
Dupont, Teflon PTFE Fluoropolymer Resin, 2012, 38 pp.
Poly-Tech Industrial, Inc., Nylon 6/6 (Polyamide), 2011, 3 pp.
Redwood Plastics, Hardness Comparison Chart, 2011, 1p.

\* cited by examiner
‡ imported from a related application

VALVE SEATS, VALVE ASSEMBLIES, AND RELATED METHODS

CROSS-REFERENCE TO RELATED APPLICATIONS

This application is a continuation of U.S. patent application Ser. No. 16/213,638, filed Dec. 7, 2018, the disclosure of which is hereby incorporated herein in its entirety by this reference.

TECHNICAL FIELD

The present disclosure relates generally to valve seats, and, more particularly, to valve seats including multiple materials, valve assemblies including valve seats including multiple materials, and related methods.

BACKGROUND

Many valve types have been employed for stopping and controlling the flow of fluids in a pipe or other flow path. Each of these valves offers certain advantages while suffering from other disadvantages. Some valve types include plug valves, ball valves, stop or globe valves, angle valves, butterfly valves, and gate valves.

Ball valves comprise a rotatable ball having a bore therethrough corresponding to the fluid flow path together with one or more seats for sealing with the ball surface. Typical ball valves have a valve body and a valve member (e.g., a ball) operatively connected to the valve body by an upstream and a downstream seal. The valve body defines a flow passage having an upstream flow-through end (e.g., leading end), a downstream flow-through end (e.g., trailing end), and a valve receiving chamber located between the upstream and downstream flow-through ends of the flow passage. The valve member is located within the valve receiving chamber, and includes a throughbore that allows passage of fluid through the valve member. The seals or seats, in conjunction with the valve member and the valve receiving chamber, define a cavity around the valve member. To prevent leakage of the valve, the seals or seats are pressed against the valve member with a given or fixed sealing pressure based, at least in part, on the maximum pressure environment in which the valve may be installed.

The valve member is coupled to an actuator via a valve stem, which is selectively rotatable to rotate the valve member within the valve receiving chamber, between a fully open position and a fully closed position. Generally, in a two way valve, the fully open position occurs when the throughbore is aligned with the flow passage at zero degrees of rotation from a centerline of the flow passage and the fully closed position occurs at ninety degrees of rotation of the valve member from the centerline.

The valve member ball is contained within the valve body between two valve seats with physical compression applied to the seats during assembly, such that the seats bear into the ball with force. In such designs, the valve seats act as a seal at the point at which they bear onto the ball, and as a seal at points at which they bear against the valve body. The valve seats also act as a spring to maintain the sealing force during operation of the valve. The "off" position usually corresponds to a position of the ball wherein the conduit is at right angles to the valve body passageway. However, lesser angular displacements may result in an "off" or partially "off" condition, depending upon the geometry of the valve components. The full "on" position is typified by the ball conduit being coaxially aligned with the fluid passageway of the valve body. A conventional ball valve provides varying degrees of flow restriction based upon the degree of alignment of the ball conduit with the valve body passageway. Thus, for a given pressure, flow is controlled by varying the degree of alignment of the ball conduit with the valve body passageway.

During the life of the ball valve, switching the ball between the "on" and "off" positions subjects the valve seats to thermal cycling, which can damage the valve seats and cause the seats to experience "creep," which degrades the seal and causes leakage within the ball valve assembly. Valve seats made of softer, more elastic materials require less compressive force to seal the ball; however, such softer, more elastic materials are more susceptible to creep, which may occur rapidly at elevated temperatures. To compensate, valve seats are often configured to provide a maximum physical compression against the ball, wherein the sealing force may be maintained even if some thermal degradation or creep occurs. However, such compressive forces require more torque to operate the ball valve.

BRIEF SUMMARY

Various embodiments of the present disclosure comprise a valve seat including an insert and an outer housing. The insert may comprise a first polymer material. The insert may be configured to be positioned proximate a valve member and to contact the valve member. The insert may define a portion of a seal between the valve member and a valve body in which the valve member is positioned. The outer housing may comprise a second polymer material. At least a portion of the insert may be positioned within the outer housing. The outer housing may be configured to be positioned between the insert and the valve body to define another portion of the seal between the valve member and the valve body. The second polymer material of the outer housing may exhibit a hardness that is greater than a hardness of the first polymer material of the insert.

Another embodiment of the present disclosure may comprise a valve assembly including a valve body, a valve member, and at least one valve seat. The valve body may include at least one port. The valve member may be positioned within the valve body. The valve member may be configured to selectively enable fluid to pass through the at least one port in the valve body. The at least one valve seat may include a seat member and a support member. The seat member may comprise a polymer material. The seat member may be positioned adjacent to the valve member and be configured to seal against the valve member. The support member may comprise another polymer material. The support member may be positioned between the seat member and the valve body and configured to seal against the valve body.

Another embodiment of the present disclosure may include a method of providing a seal in a ball valve. The method may include positioning a first section of a seat comprising a first polymer material adjacent to a movable ball of the ball valve. The method may also include positioning a second section of the seat comprising a second polymer material adjacent to a body of the ball valve. The movable ball may be forced into the seat to form a seal between the movable ball and the valve body with the seat.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
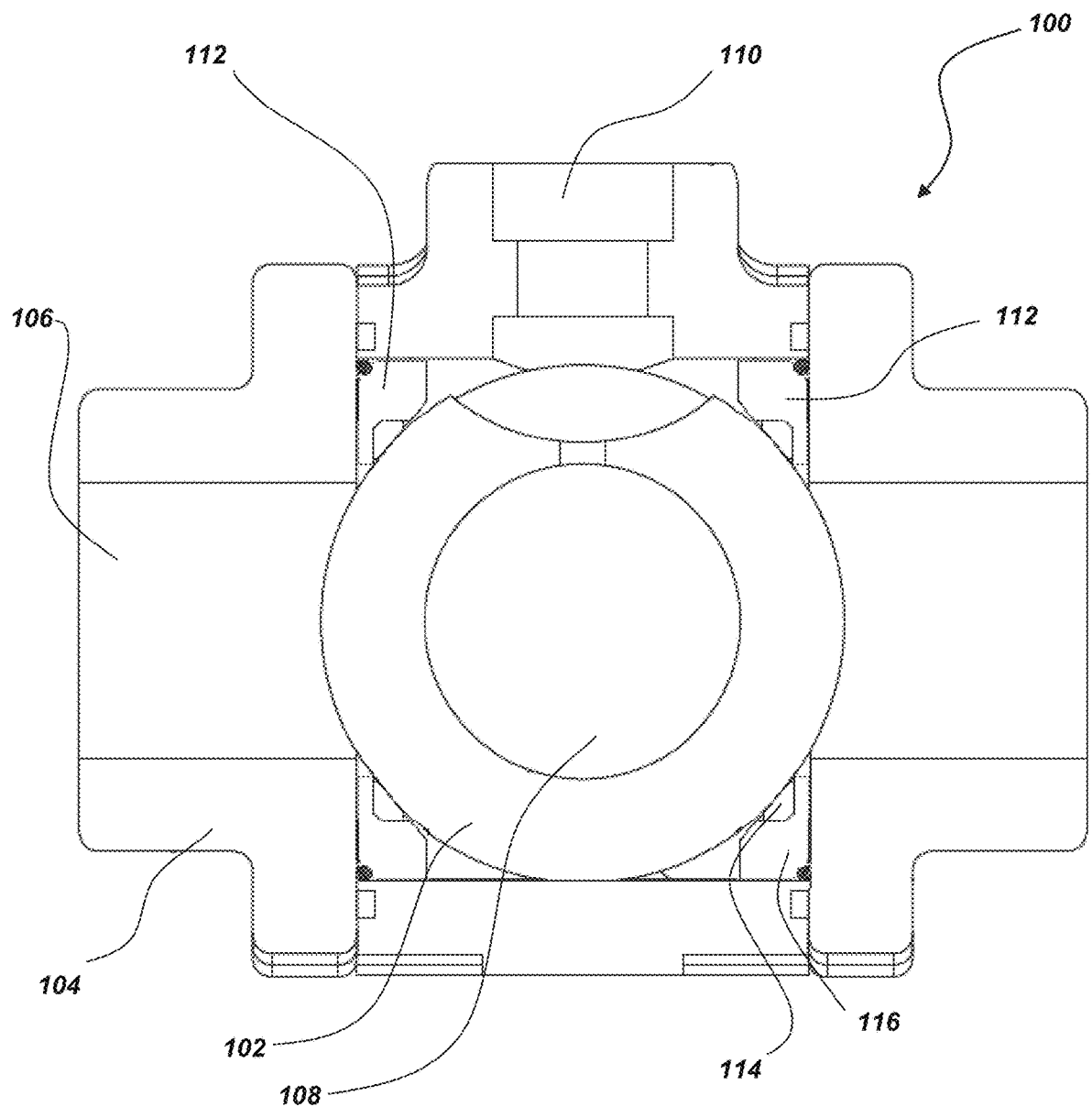
FIG. 1 is a cross-sectional side view of a valve including one or more valve seats in a closed position in accordance with an embodiment of the disclosure.

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material.

Embodiments of the present disclosure may be utilized to control fluid flow in a system operated at normal environmental conditions and/or in high pressure and/or high temperature systems. In some embodiments, such systems may include industrial applications (e.g., power plants, processing systems, mineral extraction, etc.), vehicles (e.g., ships, tankers, submarines, locomotives, etc.), or control systems (e.g., hydraulic systems, pneumatic systems, etc.).

Valve assemblies may include a valve member, such as a ball, contained in a valve body between two valve seats with physical compression applied to the seats during assembly such that the seats bear into the ball with force. In such designs, the valve seats act as a seal at the point at which they bear onto the ball. The valve seats also act as a seal at points at which they bear against the valve body. The valve seats also act as a biasing force or spring to maintain the sealing force during operation of the valve. This design may be problematic in that softer, more elastic materials, which require less compressive force to form a seal against the ball, are less resilient to thermal stressing over the life of the valve. Moreover, softer, more elastic materials are susceptible to deformation, such as higher rates of creep, at any given temperature, and are prone to rapid rates of creep at elevated temperatures. An example of a common material used for valve seats that is susceptible to such problems is polytetrafluoroethylene (PTFE). Thermal stressing and creep can degrade the seal against the ball valve, and result in leakage, particularly when the ball is switched between the open and closed positions.

Further, valves may be utilized to control fluid flow in high pressure and/or high temperature systems may be exposed to relatively large forces associated both with the pressure and impact from fluid flow (e.g., changes in fluid flow) that are absorbed by the valve seats when the valve is closed, opened, or moving between the open and closed positions.

In order to avoid some of the problems with relatively softer seats, seats may be formed from higher strength materials that can withstand higher loads resulting from high pressure or shock and generally higher operating temperatures. Such higher strength seats may present the disadvantage of requiring a higher sealing force combined with their higher frictional coefficient, in comparison to relatively softer seat materials, resulting in a significantly higher torque being required to operate the valve. For example, such high strength materials may create higher friction between the valve seats and the valve member than the relatively lower strength valve seat materials. The increased friction may require increased amounts of torque to operate the valve. High pressure systems may also increase the amount of torque required to operate the valve. The combined effect of the increased friction and the increased pressure may result in large amounts of required torque. Large amounts of torque may require larger, cumbersome, and/or more expensive actuation devices (e.g., electronic or manually operated actuators).

Embodiments of the present disclosure may provide a valve seat (e.g., a compound valve seat) that comprises multiple materials in multiple regions. For example, such valve seats may include a relatively lower strength material (e.g., a material exhibiting a lower hardness) that is positioned adjacent a valve member (e.g., a ball element) and a relatively higher strength material (e.g., a material exhibiting a relatively higher hardness) that supports the lower strength material (e.g., under a higher loading scenario) and that may be positioned between the lower strength material and a body of the valve. In some embodiments, the valve seat may comprise one or more sections (e.g., two separable, distinct pieces or elements) that each comprise one of the higher or lower strength materials and that are utilized in unison to define the valve seat. In additional embodiments, the valve seat may be formed as a single section with multiple material regions or may include more than two separate, distinct pieces or elements.

Figure 2:
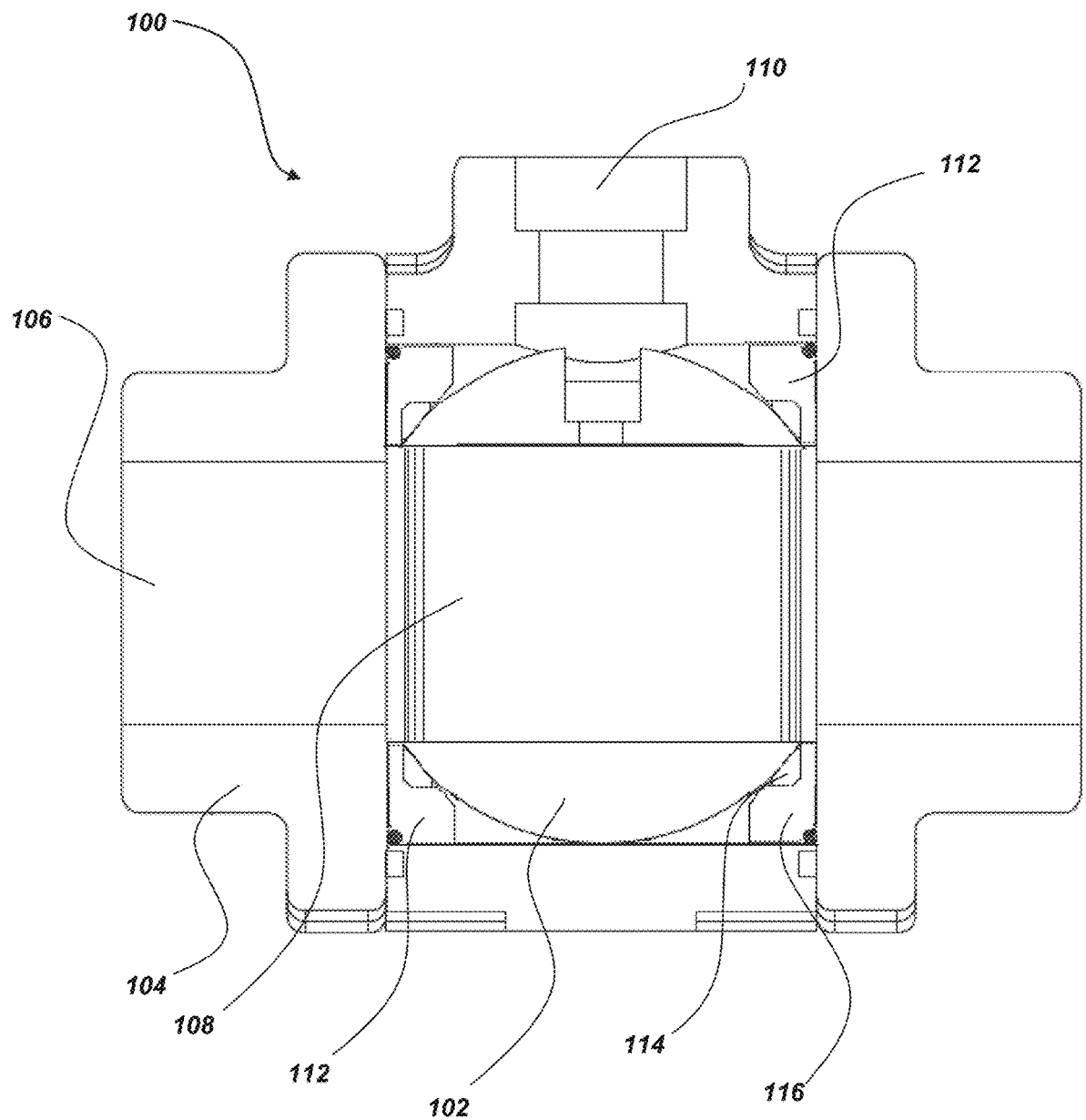
FIG. 2 is a cross-sectional side view of the valve including one or more valve seats of FIG. 1 in an open position.

FIG. 1 illustrates a cross-sectional view of a valve 100 (e.g., a ball valve) including one or more valve seats 112 in the closed position. The ball valve 100 may include a valve member (e.g., ball 102, obstructor, etc.) movably positioned (e.g., floating or mounted) in a valve body 104 (e.g., including a central housing with two end caps) to control fluid flow through the valve 100. The valve body 104 may define a conduit 106 (e.g., path, passage, port, etc.) through the valve body 104. The ball 102 may include a port 108 (e.g., hole, path, passage, etc.) through the ball 102. A stem 110 may extend through the valve body 104 and be operatively coupled to the ball 102. The ball 102 may be configured to selectively inhibit (e.g., obstruct, at least partially inhibit, substantially stop, substantially prevent, etc.) fluid flow through the ball valve 100 when the ball 102 is in a closed position (e.g., positioned such that the port 108 is not aligned with the conduit 106), as illustrated in FIG. 1. The stem 110 may cause the ball to rotate between the closed position and an open position (e.g., wherein the ball 102 is positioned such that the port 108 is aligned with the conduit 106, as shown in FIG. 2).

The seats 112 (e.g., seal, annular ring, etc.) may be positioned within the valve body 104 where the ball 102 and the conduit 106 meet. Each valve seat 112 forms a substantially fluid-tight seal through engagement with portions of the valve 100, for example, with the valve member or ball 102 and the valve body 104. The seats 112 may at least partially or substantially entirely inhibit flow of fluid around the ball valve 100 when the ball 102 is in a closed position and/or an open position by defining one or more seals between the ball 102 and the valve body 104.

The ball 102 may rest adjacent to and/or against the seats 112. The seats 112 may be annular (e.g., ring-shaped, substantially circular, etc.). The seats 112 may be configured to form a seal between the ball 102 and the valve body 104. In some embodiments, the seats 112 may have a complementary shape to the ball 102. For example, the seats 112 may exhibit a conical shape (e.g., frustoconical) with an angled inner surface. In some embodiments, the seats 112 may have a complex shape (e.g., an at least partially arcuate shaped cross section) such as a hemispherical slice configured to complement a spherical shape of the ball 102 (e.g., having substantially the same radius).

As depicted, one or more of the seats 112 may be formed in at least two regions or sections. A first region 114 may be at least partially formed from a first material (e.g., substantially all or an entirety of the first region 114 may comprise the first material) and a second region 116 may be at least partially formed from a second material (e.g., substantially all or an entirety of the second region 116 may comprise the second material). In some embodiments, the first material and the second material may be different materials (e.g., having differing material properties). In some embodiments, the first material may be a softer or relatively more flexible material than the second material.

For example, the first material or an entirety of the first region 114 may have a relatively low durometer indicating the relatively low hardness of the material as compared to other relatively stiffer (e.g., rigid) polymers or other types of materials. The first material may have a hardness (e.g., durometer) less than about 100 on the Rockwell R scale, such as less than about 90 on the Rockwell R scale, less than about 75 on the Rockwell R scale, less than about 60 on the Rockwell R scale, and greater than 50 on the Rockwell R scale (e.g., between on the Rockwell R scale 50 and 60, 55 and 65, 60 and 70, 55 and 80, 50 and 90, etc.). The second material or an entirety of the second region 116 may have a hardness (e.g., durometer) greater than about 90 on the Rockwell R scale, such as greater than about 100 on the Rockwell R scale, greater than about 110 on the Rockwell R scale, greater than about 120 on the Rockwell R scale, greater than about 130 on the Rockwell R scale, and less than about 150 on the Rockwell R scale (e.g., between on the Rockwell R scale 90 and 140, 100 and 130, 110 and 130, 115 and 125, 90 and 150, etc.).

By way of further example, the first region 114 may be formed from a material having a type A Shore hardness of less than 100 (e.g., between 80 and 100, 90 and 100, 70 and 100) and the second region 116 may be formed from a material having a type D Shore hardness of between 75 and 100 (e.g., between 80 and 100, 90 and 100).

In some embodiments, the first material (e.g., an entirety of the first region 114) may be a flexible material (e.g., resilient material) and the second material (e.g., an entirety of the second region 116) may be a rigid material. For example, the first material may have a modulus of elasticity (e.g., Young's modulus) between about 0.1 GPa and about 2 GPa, such as between about 0.3 GPa and about 1 GPa, between about 0.4 GPa and about 0.9 GPa, or between 0.4 GPa and 0.6 GPa. The second material may have a modulus of elasticity between about 1.5 GPa and about 6 GPa, such as between about 2.0 GPa and about 5 GPa, between about 2.5 GPa and about 4 GPa, or between about 3 GPa and about 4 GPa.

In some embodiments, the second material (e.g., an entirety of the second region 116) may have a modulus of elasticity that is more than one times (1×) greater than (e.g., between 1.1× to 5.0× greater, at least 1.25× greater, at least 1.5× greater, at least 1.75× greater, at least 2.0× greater, combinations thereof) the modulus of elasticity of the first material (e.g., an entirety of the first region 114).

The first material may be a soft or relatively flexible sealing material, such as a polymer (e.g., plastics, elastomers, rubbers, etc.). In some embodiments, the flexible sealing material may be rubber such as, ethylene propylene diene (EPDM), nitrile rubber (NBR), styrene butadiene rubber (SBR), silicon rubber, butyl rubber, polybutadiene, etc. In some embodiments, the soft sealing material may be a plastic such as, tetrafluoroethylene (TFE), polytetrafluoroethylene (PTFE), modified PTFE (e.g., TFM, DYNEON® TFM 1600, DYNEON® TFM 1700), or reinforced polytetrafluoroethylene (RTFE).

The second material may be a relatively harder or stiffer material such as, such as a polymer (e.g., plastics) or other harder materials, such as ceramics, composites, etc. In some embodiments, the second material may comprise nylon plastics (e.g., NYLATRON®), polyaryletherketone (e.g., PAEK, polyether ether ketone (PEEK)), polyoxymethylene (e.g., POM, acetal, polyaceal, polyformaldehyde, DELRIN®, CELCON®, RAIVITAL®, DURACON®, KEPITAL®, and HOSTAFORM®), reinforced TFM (e.g., TFM1600+20% GF), carbon filled PTFE, or polychlorotrifluoroethylene (e.g., PCTFE, PTFCE, KEL-F®, etc.).

FIG. 2 illustrates a cross section of the ball valve 100 in an open position. In the open position, the port 108 through the ball 102 may be substantially aligned with the conduit 106 through the valve body 104 such that fluid may pass through the ball valve 100. In the open position, the force between the ball 102 and the seat 112 may be reduced. When the ball valve 100 returns to a closed position (FIG. 1), the increase in force between the ball 102 and the seat 112 may be introduced suddenly such that the impact (e.g., shock, impulse, etc.) absorbed by the seat 112 may be greater than the force that the pressure alone would cause when the ball valve 100 is in a closed position.

The seats 112 may substantially inhibit or limit flow of fluid around the ball valve 100 when the ball 102 is in one or both of the open position and the closed position by defining a seal between the ball 102 and the valve body 104.

For example, the seats 112 may act to at least partially ensure that a majority or entirety of the fluid flow travels through an intended flow path (e.g., through the ball 102) while minimizing or entirely preventing fluid from traveling around the outside of the ball 102 when the ball 102 is in the open position. Likewise, the seats 112 may prevent unwanted fluid flow around the ball 102 when in the closed position.

Figure 3:
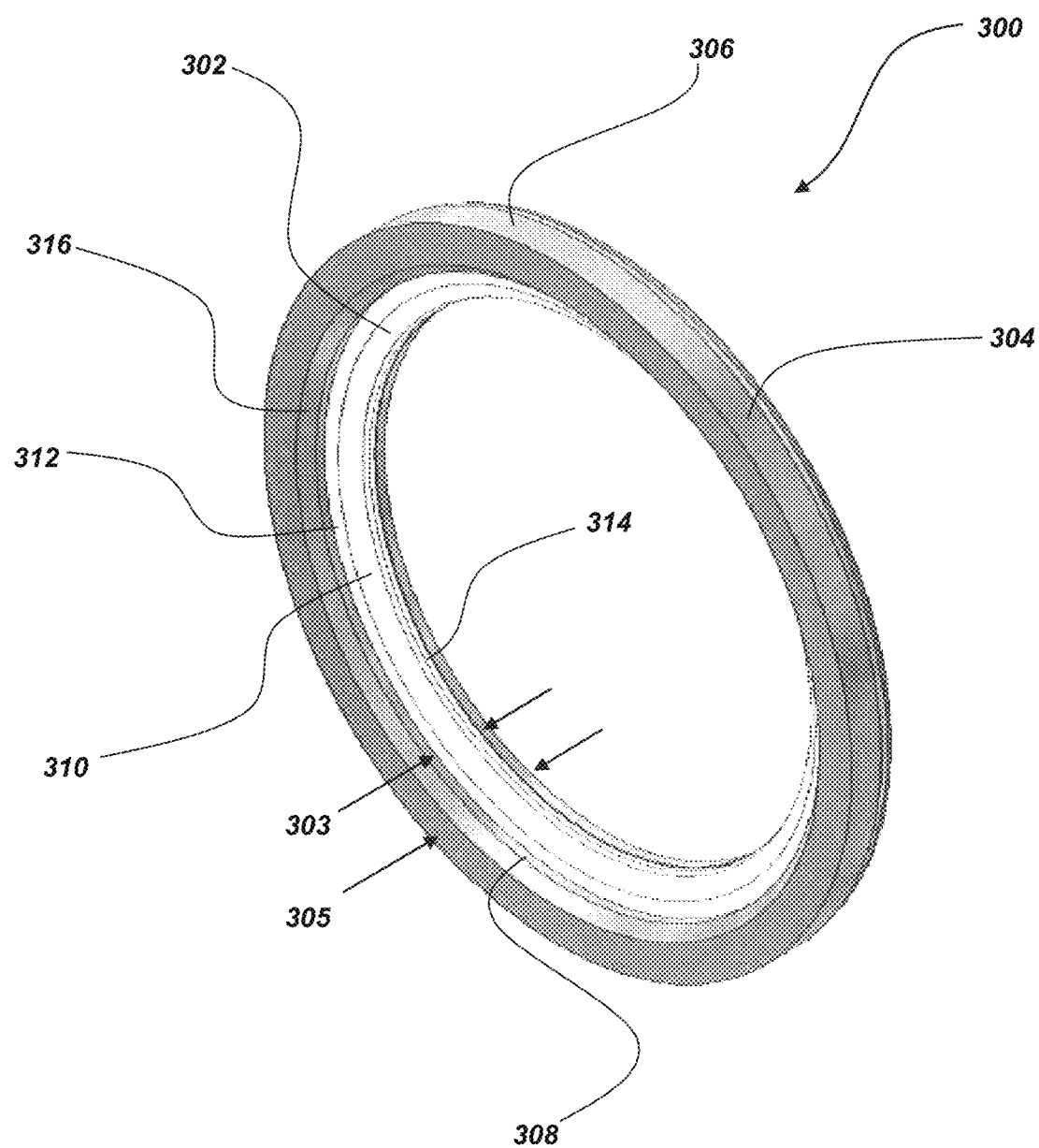
FIG. 3 illustrates an isometric view of a valve seat according to an embodiment of the present disclosure.

FIG. 3 illustrates an isometric view of a valve seat 300, which may be similar and include one or more of the features of the other valve seats discussed herein. Referring to FIGS. 1 and 3, the valve seat 300 may include a first seat section (e.g., an insert 302, seat member, first region, first section) and a second support section (e.g., an outer housing 304, support member, second region, second section). The outer housing 304 may include an outer surface 306 (e.g., lateral or radial extent, outer wall) and an inner surface 308 (e.g., radially inner wall). The outer surface 306 of the outer housing 304 may be positioned adjacent the valve body 104 (e.g., bordering, contacting, securing the housing 304 against the valve body 104). For example, the outer housing 304 may be sized such that an outer diameter of the outer surface 306 is substantially the same or slightly smaller or even larger than an inner diameter of the valve body 104 such that the outer housing 304 sits within, adjacent to or contacting, the valve body 104 (e.g., while optionally forming an interference fit, press fit, friction fit with the valve body 104).

The outer housing 304 may operate as a spacer providing separation between the insert 302 and the valve body 104 while supporting the insert 302 (e.g., by limiting deformation of the insert 302). For example, the outer housing 304 may enable the insert 302 to elastically deform (e.g., to conform to the shape of the ball 102 under loading) without failing (e.g., breaking the seal between the valve seat 300 and the valve body 104), for example, by deforming to an extent that the insert 302 no longer makes sealing contact with the ball 102.

The insert 302 may be at least partially disposed within the outer housing 304. For example, the insert 302 may be disposed such that an entirety of a width 303 (e.g., an axial extent) of the insert 302 is received within the width 305 (e.g., an axial extent) of the outer housing 304. In some embodiments, only a portion of the width 303 of the insert 302 may be disposed within the outer housing 304, such that a portion of the insert 302 protrudes in an axial direction from one or more axial sides of the outer housing 304.

In some embodiments, the insert 302 may be at least partially surrounded (e.g., radially surrounded) by the outer housing 304, such that an entirety of the insert 302 is positioned radially within the outer housing 304. For example, the insert 302 may exhibit a diameter that fits within a larger diameter of the outer housing 304. In additional embodiments, at least a portion of the insert 302 may extend beyond an outer portion of the outer housing 304.

The insert 302 may be fitted within the outer housing 304. For example, the insert 302 may be secured to the inner surface 308 of the outer housing 304 through an interference fit (e.g., press fit, friction fit, etc.). In some embodiments, the insert 302 may be otherwise secured to the inner surface 308 of the outer housing 304, for example, with an adhesive (e.g., epoxy, glue, adhesive strips, etc.). or through other known processes such as, plastic welding, friction welding, chemical welding, soldering, intersecting threads, etc.

The insert 302 may include a seating surface 310 positioned proximate the ball 102 and configured to contact and/or form a seal between the insert 302 and the ball 102.

The seating surface 310 may be substantially flat or planar and angled (e.g., relative to the axis of the seat 300) such that a leading end 312 has a larger diameter than a trailing end 314 (e.g., the seating surface 310 exhibits a frustoconical shape). In some embodiments, the seating surface 310 may have a complementary radius to the portion of the ball 102 which the seating surface 310 contacts (e.g., substantially the same radius as the contacting portion of the ball 102). In some embodiments, the seating surface 310 may be formed from multiple intersecting frustoconical-shaped surfaces.

The outer housing 304 may include a secondary seating surface 316. For example, the secondary seating surface 316 may provide another seal between the valve seat 300 and the ball 102 if the seating surface 310 of the insert 302 fails to form a seal or in addition to the seating surface 310 of the insert 302. As depicted, the secondary seating surface 316 may exhibit substantially the same shape as the seating surface 310 of the insert 302 (e.g., a frustoconical shape configured to engage with a larger diameter portion of the ball 102). In some embodiments, the secondary seating surface 316 may be formed such that the ball 102 does not contact the secondary seating surface 316 unless or until a selected level of force (e.g., fluid flow, pressure, etc.) is reached. In some embodiments, the secondary seating surface 316 may be formed such that the ball 102 does not contact the secondary seating surface 316 unless or until the insert 302 becomes worn, damaged (e.g., plastically deformed), or otherwise cannot form a seal against the ball 102.

The outer housing 304 may be formed from a harder material than the insert 302 as described above with respect to the first region 114 and the second region 116 of FIG. 1. A softer material may require less force to form a seal. For example, the force required to elastically deform the insert 302 between the ball 102 and the outer housing 304 may be relatively lower. The reduced force may allow the ball 102 to move more easily against the insert 302. However, the softer material on the insert 302 alone may lack the strength to withstand high pressures present within the valve 100, thereby potentially damaging the insert 302 if used alone. The harder material of the outer housing 304 may compensate for the reduced strength of the insert 302 and support the insert 302 (and the ball 102) in environments involving relatively higher forces and pressures. Such hard and soft materials may be similar to the first and second materials described above with respect to FIG. 1.

Figure 4:
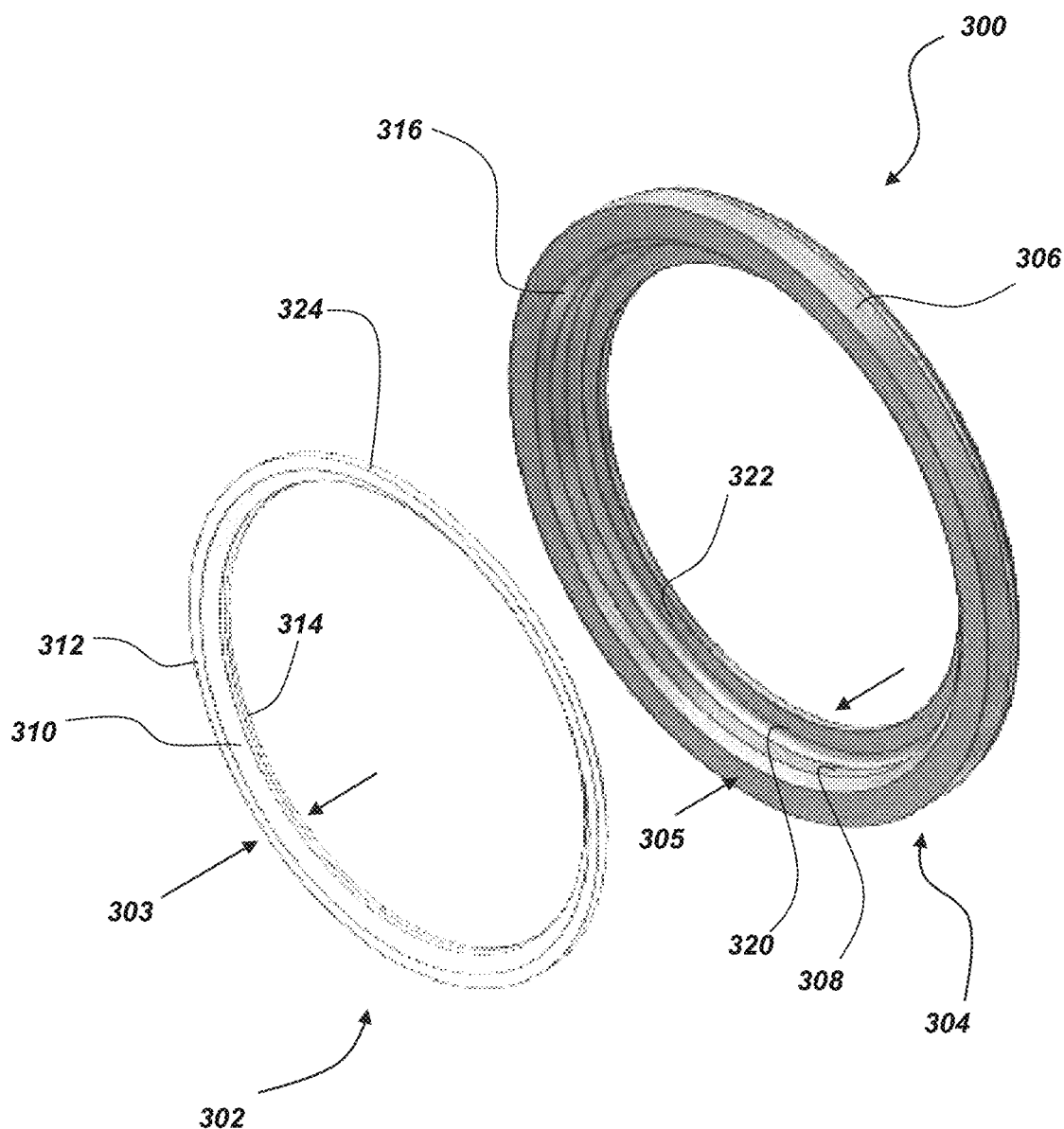
FIG. 4 illustrates an exploded isometric view of a valve seat according to an embodiment of the present disclosure.

FIG. 4 illustrates the valve seat 300 of FIG. 3 in an exploded view. Referring to FIGS. 1 and 4, the outer housing 304 may include a recess 320 defined by the inner surface 308 of the outer housing 304 and a shelf 322 (e.g., ridge, retention, stop, etc.). The insert 302 may be secured within the recess 320 such that the trailing end 314 of the insert 302 rests against the shelf 322. In some embodiments, the insert 302 may be secured to or in the outer housing 304 as described above with respect to FIG. 3. In some embodiments, the pressure provided by the ball 102 in the valve assembly may maintain the insert 302 in position. The pressure creating a seal between the ball 102 and the seating surface 310 of the insert 302 may similarly create a seal between an outer portion 324 of the insert 302 and the inner surface 308 of the outer housing 304 and/or between the trailing end 314 of the insert 302 and the shelf 322 of the housing 304.

In some embodiments, an intermediary seal may be included in the valve seat 300. The intermediary seal may be another annular ring formed from a polymeric material. In some embodiments, the intermediary seal may be formed from a material that is harder than the insert 302 and softer than the outer housing 304. In some embodiments, the intermediary seal may be formed from an elastomeric material (e.g., rubber) such as, an O-ring or sealing strip. The intermediary seal may be configured to conform to differences in geometry between the outer portion 324 of the insert 302 and the inner surface 308 of the outer housing 304.

Figure 5:
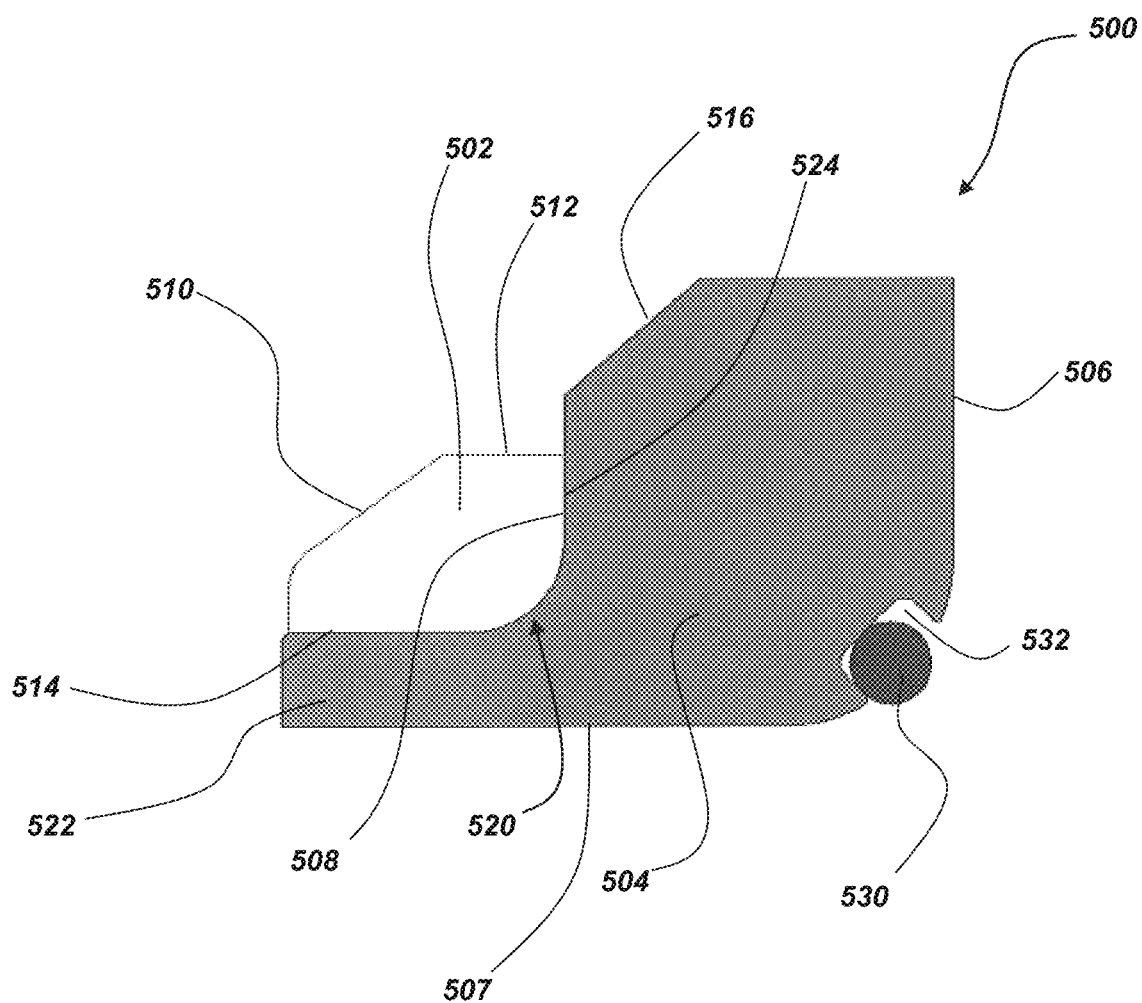
FIG. 5 illustrates an enlarged cross-sectional view of a valve seat according to an embodiment of the present disclosure.

FIG. 5 illustrates a cross-sectional view of a valve seat 500, which may be similar and include one or more of the features of the other valve seats discussed herein. Referring to FIGS. 1 and 5, the valve seat 500 may include an insert 502 and an outer housing 504. The insert 502 may be disposed within a recess 520 in the outer housing 504 where a trailing end 514 of the insert 502 rests against a shelf 522 and an outer radial portion 524 of the insert 502 is positioned adjacent or rests against an inner surface 508 of the outer housing 504. As described above with respect to FIGS. 3 and 4, the insert 502 may be formed from a soft sealing material configured to form a seal between the insert 502 and the ball 102. The outer housing 504 may likewise be formed from a harder sealing material, as described above. The relatively harder sealing material of the outer housing 504 may be configured to form a seal between the outer housing 504 and the ball 102. In some embodiments, a seating surface 510 of the insert 502 may be configured to form a seal with the ball 102. For example, a secondary seating surface 516 on the outer housing 504 may define a seal between the outer housing 504 and the ball 102 in addition to the seal formed with the insert 502 or when the seating surface 510 of the insert 502 fails to form a seal.

In some embodiments, the insert 502 may include an end portion (e.g., a leading end 512) that spaces the seating surface 510 from a portion of the outer housing 504. For example, the leading end 512 may define a surface aligned in an axial direction of the seat 500 that spaces the seating surface 510 from the outer housing 504 (e.g., the seating surface 516 of the outer housing 504) and may act to at least partially align the seating surfaces 510, 516 in a substantially similar angled plane.

In some embodiments, the insert 502 may include another end portion (e.g., the trailing end 514) that spaces the seating surface 510 from another portion of the outer housing 504 (e.g., the shelf 522).

Although the outer housing 502 may at least partially be utilized to seal against the valve body 104, the harder sealing material of the outer housing 504 may require a higher amount of force to form a seal than the soft sealing material of the insert 502. However, the harder sealing material of the outer housing 504 may withstand forces due to higher pressures better than the soft sealing material of the insert 502. In some embodiments, the seating surface 510 of the insert 502 may form a seal against the ball 102 while the secondary seating surface 516 of the outer housing 504 may support the ball 102 (and the insert 502) in, for example, high pressure applications (e.g., to counteract forces applied to the seat 500 with the ball 102).

Similar to that discussed above, the outer housing 504 may include an outer surface 506 (e.g., lateral or radial extent, outer wall) that is positioned adjacent a radial portion of the valve body 104 (e.g., bordering, contacting, securing the housing 504 against the valve body 104). The outer housing 504 may include an end surface 507 (e.g., an axial end, an axial outer wall) that is positioned adjacent an axial portion (e.g., an end cap) of the valve body 104 (e.g., bordering, contacting, securing the housing 504 against a portion of the valve body 104).

In some embodiments, the outer housing 504 may include a sealing element 530 (e.g., outer body seal) positioned between the outer housing 504 and the valve body 104 to provide a seal between the outer housing 504 and valve body 104. For example, the seat 500 may provide a seal between the ball 102 and the valve body 104 with (e.g., by elastically deforming) both the insert 502 and the sealing element 530.

As depicted, the outer housing 504 may include a groove 532 (e.g., slot, recess, etc.) configured to retain the sealing element 530. The sealing element 530 may be at least partially (e.g., partially, substantially, etc.) disposed within the groove 532 at chamfered surface between the outer surface 506 and the end surface 507 of the outer housing 504. In some embodiments, the sealing element 530 may be formed from substantially similar materials to the insert 502. For example, the materials of the sealing element 530 and the insert 502 may be selected to elastically deform at substantially the same level of force in order to define the seal in the valve 100. For example, the sealing element 530 may be formed from a polymer material, for example, an elastomeric material, such as rubber (e.g., ethylene propylene diene (EPDM), nitrile rubber (NBR), styrene butadiene rubber (SBR), silicon rubber, butyl rubber, polybutadiene, etc.), neoprene (e.g., polychloroprene, pc-rubber, etc.), polytetrafluoroethylene (PTFE), or polyurethane. In some embodiments, the sealing element 530 may be an O-ring (e.g., with a circular cross section), a D-ring (e.g., having at least one flat side), or an annular ring with another geometric cross section (e.g., oval, ellipsis, parabolic, square, rectangular, triangle, pentagon, hexagon, octagon, etc.) or an asymmetric cross section.

The sealing element 530 may create and/or maintain a seal between the valve seat 500 and the valve body 104. The sealing element 530 may operate as a primary seal substantially inhibiting (e.g., at least partially inhibiting, stopping, preventing, etc.) fluid from passing between the valve seat 500 (e.g., the outer housing 504) and the valve body 104 (e.g., around an outer portion of the valve seat 500). In some embodiments, the sealing element 530 may operate as a secondary (e.g., backup, fail-safe, etc.) seal to prevent fluid from passing between the valve seat 500 and the valve body 104 should another seal (e.g., a seal provided by one or more portions of the outer housing 504) between the outer housing 504 and the valve body 104 fail.

Figure 6:
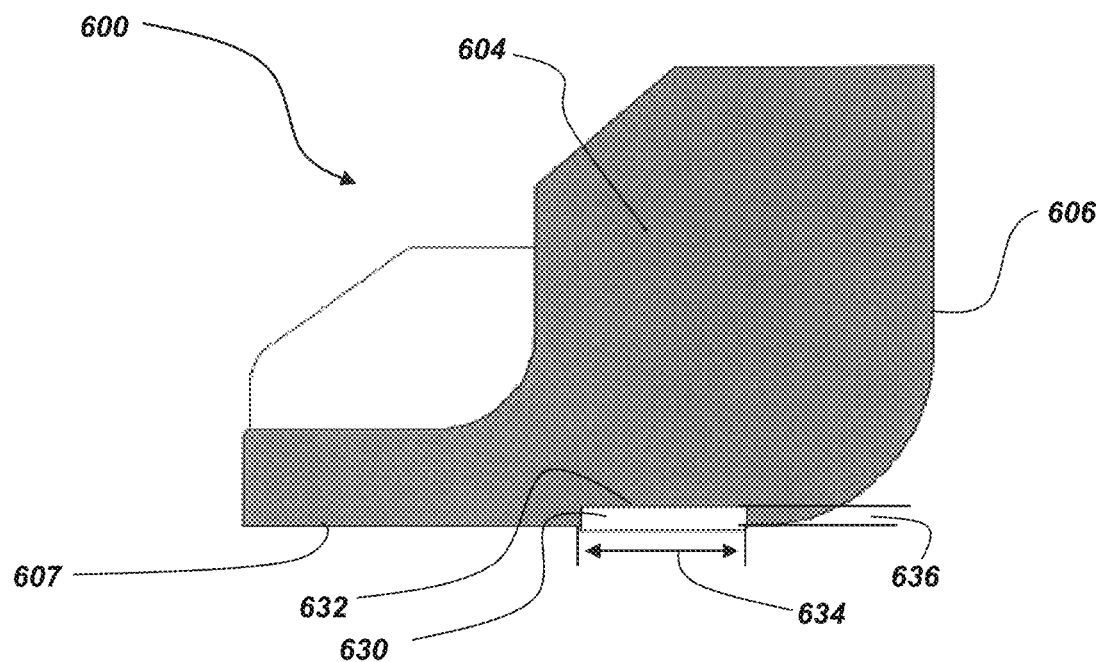
FIG. 6 illustrates an enlarged cross-sectional view of a valve seat according to an embodiment of the present disclosure.

FIG. 6 illustrates a cross-sectional view of a valve seat 600, which may be similar and include one or more of the features of the other valve seats discussed herein. Referring to FIGS. 1 and 6, a portion of an outer housing 604 (e.g., a trailing surface 607, such as an axially outer surface) may be configured to define a seal between the valve seat 600 and the valve body 104. As depicted, a sealing element 630 may be positioned between the outer housing 604 and the valve body 104. For example, the outer housing 604 may include a slot 632 (e.g., groove, recess, etc.) defined in the trailing surface 607 configured to retain the sealing element 630. The sealing element 630 may be at least partially (e.g., partially, substantially, etc.) disposed within the slot 632. In some embodiments, the sealing element 630 may be formed from a relatively softer polymer or elastomeric material similar to the sealing element 530 described above with respect to FIG. 5. As depicted, the sealing element 630 may be at least one sealing strip (e.g., substantially flat annular ring). The sealing element 630 may have a width 634 that is substantially greater than a height 636 of the sealing element 630.

As depicted, the sealing element 630 may be positioned between the trailing surface 607 of the outer housing 604 and the valve body 104. In some embodiments, the sealing element 630 may be positioned between the outer surface 606 of the outer housing 604 and the valve body 104 or at an interface between the outer surface 606 and the trailing surface 607.

Figure 7:
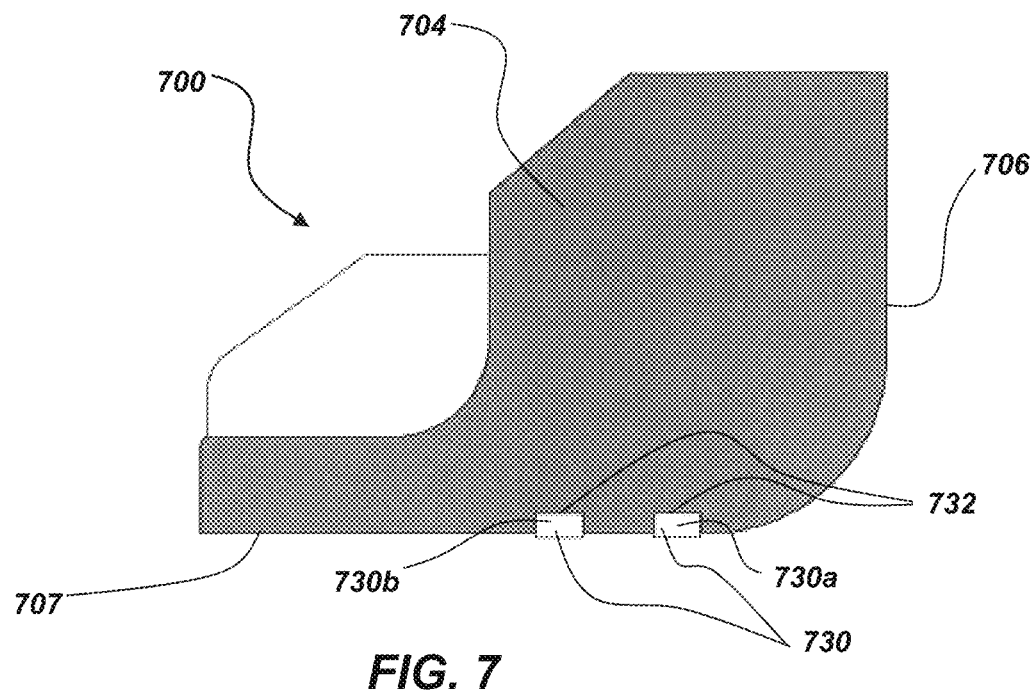
FIG. 7 illustrates an enlarged cross-sectional view of a valve seat according to an embodiment of the present disclosure.

FIG. 7 illustrates a cross-sectional view of a valve seat 700, which may be similar and include one or more of the features of the other valve seats discussed herein. Referring to FIGS. 1 and 7, a portion of an outer housing 704 (e.g., a trailing surface 707, such as an axially outer surface) may be configured to define a seal between the valve seat 700 and the valve body 104. As depicted, one or more sealing elements 730 may be positioned between the outer housing 704 and the valve body 104. For example, the outer housing 704 may include one or more slots 732 (e.g., groove, recess, etc.) defined in the trailing surface 707 configured to retain the one or more sealing elements 730. The one or more sealing elements 730 may be at least partially (e.g., partially, substantially, etc.) disposed within the one or more slots 732. In some embodiments, the one or more sealing elements 730 may be formed from a relatively softer polymer or elastomeric material similar to the sealing element 530 described above with respect to FIG. 5.

As depicted, the one or more sealing elements 730 may be at least one of an annular sealing ring as described above with respect to FIG. 5 or a sealing strip as described above with respect to FIG. 6. In some embodiments, the one or more sealing elements 730 may include at least two sealing elements 730 comprising annular sealing rings and/or sealing strips.

In some embodiments, the one or more sealing elements 730 may be positioned between a trailing surface 707 of the outer housing 704 and the valve body 104. In some embodiments, the one or more sealing elements 730 may be positioned between the outer surface 706 of the outer housing 704 and the valve body 104 or at an interface between the outer surface 706 and the trailing surface 707. In some embodiments, the one or more sealing elements 730 may be positioned on different surfaces of the outer housing 704, such as those discussed above.

The embodiments of the present disclosure may provide valve seats having a relatively softer seat for contacting the valve member, which may provide low friction, lower required sealing forces, lower required amounts of torque during actuation, and/or relatively higher chemical resistance. The valve seat also provides a support region having a higher strength (e.g., stiffer) material having a greater resilience to high loads and/or high pressure/temperature than a softer seat. Such a combination or compound seat may be ideally suited to applications involving high pressure and/or high temperature, along with high loads or shock loading.

Valve seats according to embodiments of the present disclosure may further provide support in high pressure systems (e.g., including high pressure fluids and/or shock loading scenarios) while maintaining seals requiring less force to rotate the ball of a ball valve. In high pressure systems, valve seats of soft materials may fail due to deformation, fatigue, or other failures as a result of the large forces associated with high pressures. The higher strength materials used in high pressure systems to compensate for the high pressures may require much greater forces (e.g., torque) to rotate the ball of the ball valve against the seat. The high forces may require more expensive and cumbersome actuators to move the valves. The embodiments of the present disclosure may enable soft seat materials to be used in high pressure applications allowing for a reduction in the amount of torque required to rotate the ball of the ball valve while maintaining the strength required to withstand the large forces associated with the high pressures.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventor.

What is claimed is:

1. A valve seat comprising:
    an insert comprising a first polymer material, the insert configured to be positioned proximate and to contact a valve member in a valve body and define a seal between the valve member and the valve seat;
    a seal housing comprising a second polymer material, at least a portion of the insert configured to be positioned within the seal housing, the seal housing configured to border the valve body only at an axial end surface and a radial side surface of the seal housing; and
    an outer body seal comprising at least two sealing rings comprising a third polymer material, the outer body seal positioned at an outer extent of the seal housing, the outer body seal configured to define another seal between the valve seat and the valve body,
    wherein the second polymer material of the seal housing exhibits a hardness that is greater than a hardness of the first polymer material of the insert and the third polymer material of the outer body seal, and
    wherein the outer body seal and the insert comprise substantially similar materials configured to elastically deform when substantially the same level of force is applied to the outer body seal and the insert by the valve member.

2. The valve seat of claim 1, wherein the at least two sealing rings are disposed in at least two respective grooves defined in the axial end surface of the seal housing.

3. The valve seat of claim 1, wherein movement of the valve member in a direction of intended fluid flow is configured to force the valve member into the insert and to force the outer body seal into the valve body.

4. The valve seat of claim 1, where the valve member comprises a ball valve, and wherein movement of the ball valve in a direction of intended fluid flow is configured to force the ball valve into the insert and to force the outer body seal into the valve body.

5. The valve seat of claim 1, wherein the axial end surface of the seal housing comprises a linear surface bordering an opposing axial end surface of the valve body.

6. The valve seat of claim 5, wherein the outer body seal is spaced from the radial portion of the valve body by the seal housing.

7. The valve seat of claim 1, wherein the outer body seal comprises one of polytetrafluoroethylene (PTFE) or an elastomer.

8. The valve seat of claim 1, wherein the insert is unconstrained in one axial direction of the valve seat.

9. The valve seat of claim 1, wherein the outer body seal is configured to border the valve body at the axial end surface.

10. A valve assembly comprising:
    a valve body comprising at least one port;

a valve member positioned within the valve body and configured to selectively enable fluid to pass through the at least one port in the valve body; and at least one valve seat comprising:

a seat member comprising a polymer material, the seat member positioned adjacent and configured to define a first seal against the valve member, wherein the seat member is unconstrained in one axial direction of the at least one valve seat; and a support member comprising another polymer material, the support member positioned between the seat member and the valve body and configured to seal against the valve body and to define a secondary seal against the valve member, wherein the support member borders and contacts the valve body at an axial extent and a radial extent of the support member.

11. The valve assembly of claim 10, wherein the valve member comprises a rotatable ball positioned in the valve body.

12. The valve assembly of claim 10, wherein the another polymer material of the support member exhibits a hardness that is greater than a hardness of the polymer material of the seat member.

13. The valve assembly of claim 10, wherein the support member comprises at least two additional seat members received at least partially in the support member, the at least two additional seat members configured to contact and seal against the valve body.

14. The valve assembly of claim 10, wherein the seat member borders and contacts the support member only at an axial extent and a radial extent of the seat member.

15. The valve assembly of claim 10, wherein the support member comprises another seat member received at least partially in the support member, the another seat member configured to contact and seal against the valve body.

16. The valve assembly of claim 15, wherein the seat member and the another seat member comprise materials configured to elastically deform at a same level of force applied to the seat member and the another seat member by the valve member.

17. A method of providing a seal in a ball valve, the method comprising:

defining a seat between a movable ball and a valve body of the ball valve, comprising:

positioning a flexible insert comprising a first polymer material in a support member between the movable ball and the support member, the support member comprising a second polymer material, the flexible insert being unconstrained in one axial direction of the seat;

positioning another flexible insert comprising a third polymer material in the support member between the support member and the valve body; and forcing the movable ball toward the support member to deform the flexible insert and the another flexible insert to define the seal between the movable ball and the valve body with the seat, the seal including a first seating surface between the movable ball and the flexible insert and a second seating surface between the movable ball and the support member.

18. The method of claim 17, further comprising elastically deforming the first polymer material of the flexible insert and the third polymer material of the another flexible insert at substantially the same level of force.

19. The method of claim 17, further comprising selecting the second polymer material of the support member to exhibit a hardness that is greater than a hardness of the first polymer material of the flexible insert and the third polymer material of the another flexible insert.

20. The method of claim 17, further comprising selecting the first polymer material of the flexible insert and the third polymer material of the another flexible insert to comprise the same material.

* * * * *